(12) United States Patent
Miller et al.

(10) Patent No.: US 9,318,915 B2
(45) Date of Patent: Apr. 19, 2016

(54) PORTABLE POWER CHARGER WITH WIRELESS AND DIRECT CHARGING CONNECTIVITY

(71) Applicants: Garold C. Miller, Glastonbury, CT (US); Nathan Daniel Weinstein, Glastonbury, CT (US)

(72) Inventors: Garold C. Miller, Glastonbury, CT (US); Nathan Daniel Weinstein, Glastonbury, CT (US)

(73) Assignee: Halo2Cloud LLC, Glastonbury, CT (US)

(*) Notice: Subject to any disclaimer, the term of this patent is extended or adjusted under 35 U.S.C. 154(b) by 182 days.

(21) Appl. No.: 14/220,524

(22) Filed: Mar. 20, 2014

(65) Prior Publication Data

US 2015/0015180 A1 Jan. 15, 2015

Related U.S. Application Data

(60) Provisional application No. 61/803,511, filed on Mar. 20, 2013.

(51) Int. Cl.
*H02J 7/00* (2006.01)
*H02J 7/02* (2006.01)
*H02J 17/00* (2006.01)

(52) U.S. Cl.
CPC ............... *H02J 7/025* (2013.01); *H02J 7/0042* (2013.01); *H02J 7/0047* (2013.01); *H02J 17/00* (2013.01)

(58) Field of Classification Search
CPC ................................ H02J 7/0047; H02J 7/025
USPC ......................................................... 320/103
See application file for complete search history.

(56) References Cited

U.S. PATENT DOCUMENTS

| 5,396,162 | A | * | 3/1995 | Brilmyer ............. H01M 2/1055 320/114 |
|---|---|---|---|---|
| 6,894,457 | B2 | | 5/2005 | Germagian et al. |
| D509,181 | S | | 9/2005 | Nellenbach et al. |
| 7,011,538 | B2 | | 3/2006 | Chang |
| 7,180,265 | B2 | * | 2/2007 | Naskali ................. H02J 7/0027 320/108 |
| D616,363 | S | | 5/2010 | Weng |
| D618,237 | S | | 6/2010 | Wang |
| D628,151 | S | | 11/2010 | Wegener et al. |
| D628,153 | S | | 11/2010 | Fujii et al. |
| D628,535 | S | | 12/2010 | Cheng |
| 7,893,657 | B2 | | 2/2011 | Chavakula |
| 7,942,691 | B1 | | 5/2011 | McSweyn |
| D641,695 | S | | 7/2011 | Wegener et al. |
| D656,096 | S | | 3/2012 | Sasada et al. |
| D659,094 | S | | 5/2012 | Brand et al. |
| 8,169,185 | B2 | * | 5/2012 | Partovi ..................... H01F 5/003 320/108 |
| D662,050 | S | | 6/2012 | Tien |
| D663,684 | S | | 7/2012 | Yang |

(Continued)

*Primary Examiner* — Sun Lin
(74) *Attorney, Agent, or Firm* — McCormick, Paulding & Huber LLP

(57) ABSTRACT

A portable charger is provided for charging one or more electronic devices from a rechargeable internal battery. The portable charger includes wireless power transmission components, such as a transmitter and a receiver for recharging the charger as well as electronic devices via wireless power transmission methods. The portable charger also includes at least one power connection for connecting the charger with an external power source, or at least one electronic device, or both, for direct charge connectivity. The power connection can be a power connection port or a power connector cable, attached to the charger housing, each capable of acting as a power input, a power output, or both. A processing unit controls operation of the charger for wireless and direct charging.

20 Claims, 9 Drawing Sheets

(56) References Cited

U.S. PATENT DOCUMENTS

| | | |
|---|---|---|
| D663,685 S | 7/2012 | Yang |
| D667,788 S | 9/2012 | Mai |
| D672,309 S | 12/2012 | Tien |
| D674,748 S | 1/2013 | Ferber et al. |
| D680,063 S | 4/2013 | Sasada |
| D682,196 S | 5/2013 | Leung |
| D682,197 S | 5/2013 | Leung |
| D686,153 S | 7/2013 | Qu |
| 8,491,330 B2 | 7/2013 | McSweyn |
| D697,867 S | 1/2014 | Weinstein et al. |
| 8,629,651 B2 * | 1/2014 | Guccione ............ H02J 7/0054 320/107 |
| D702,632 S | 4/2014 | Salmon |
| D713,785 S | 9/2014 | Tehrani |
| 9,093,848 B2 * | 7/2015 | Miller ................ H02J 7/0027 |
| 2004/0085694 A1 | 5/2004 | Germagian et al. |
| 2007/0126290 A1 | 6/2007 | Jaynes et al. |
| 2011/0187315 A1 | 8/2011 | McGinley et al. |
| 2012/0187902 A1 | 7/2012 | Wang |
| 2013/0030892 A1 | 1/2013 | Liu et al. |
| 2013/0076298 A1 * | 3/2013 | Miller ................ H02J 7/0027 320/103 |
| 2013/0193911 A1 | 8/2013 | Miller et al. |

* cited by examiner

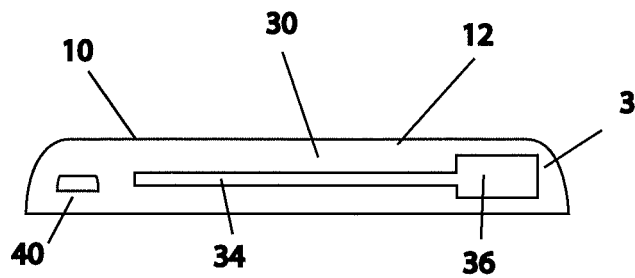
FIG. 4
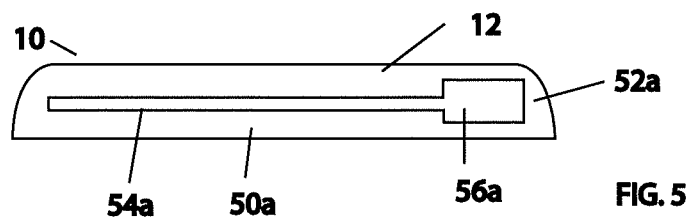
FIG. 5
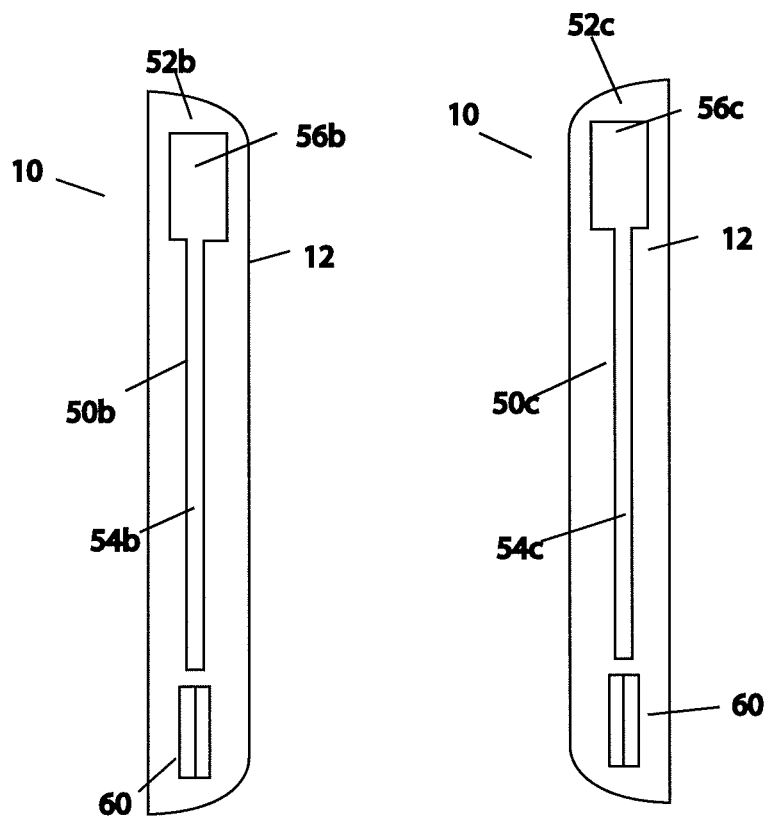
FIG. 6
FIG. 7

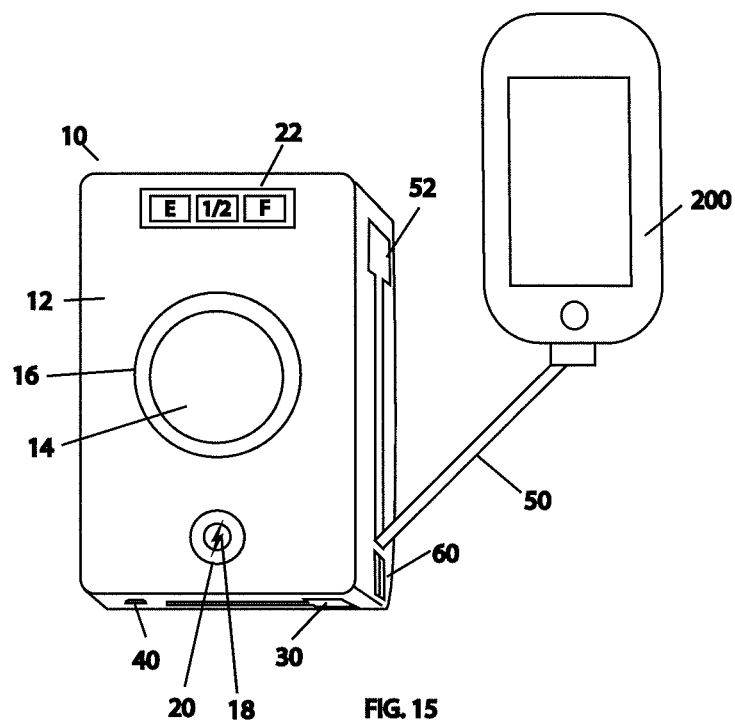
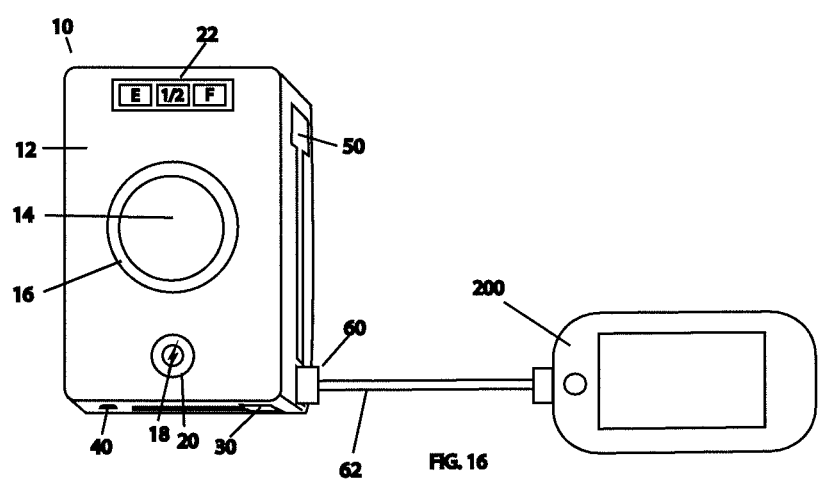

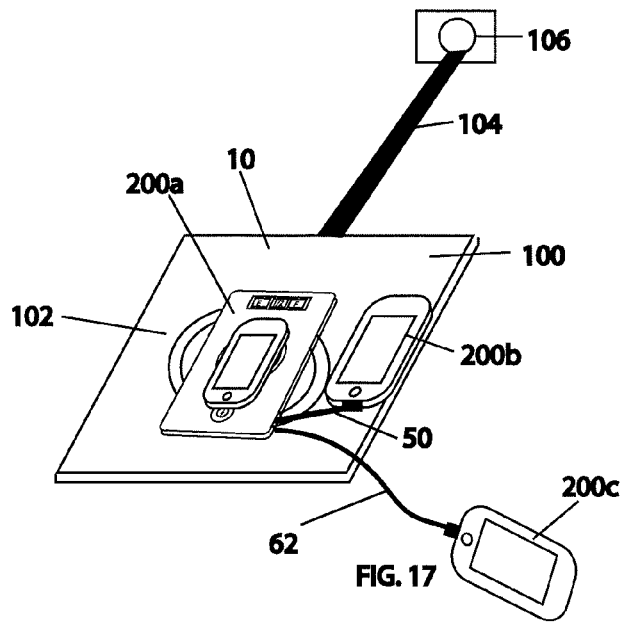
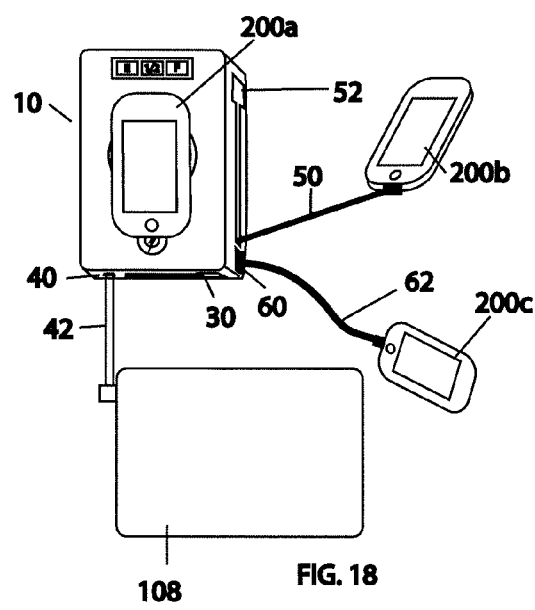
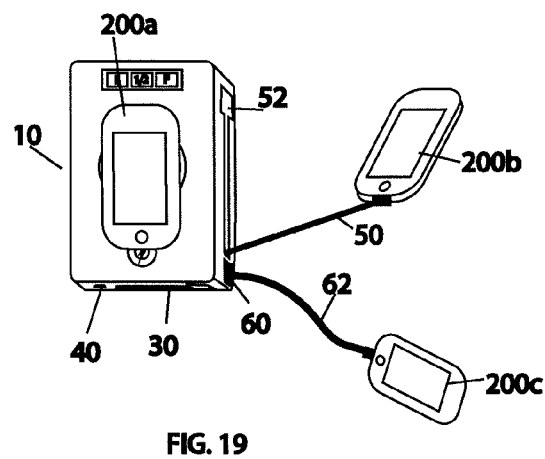

PORTABLE POWER CHARGER WITH WIRELESS AND DIRECT CHARGING CONNECTIVITY

CROSS-REFERENCE TO RELATED APPLICATION

This application claims the benefit of U.S. Provisional Application No. 61/803,511, filed Mar. 20, 2013, which is incorporated herein by reference.

FIELD OF INVENTION

The present invention generally relates to a power charging apparatus and method, and more particularly relates to a portable charger for charging electronic devices in a variety of manners, including via direct connection or via wireless power transmission.

BACKGROUND OF THE INVENTION

Present day consumers typically own several electronic devices specifically designed for portability and on-the-go use, including, for example, a mobile phone or smart phone, a portable music player like an iPod® or an MP3 player, a tablet, a portable gaming unit, a camera, and the like. Each of these devices requires frequent recharging. Such electronic devices typically utilize a cable for connecting the device to a power source, such as a wall outlet, a car charger, an airplane charger, or a computer. However, a separate cable is usually required for each power source. Moreover, different electronic devices often utilize different connection ports and interfaces such that a single charging cable is not compatible with multiple devices. Accordingly, a tech-savvy consumer, with several electronic devices, will usually have multiple charging cables to keep track of. Even then, the consumer may be without sufficient power to recharge a phone due to bad weather or a power outage, or may not always be in a place where a power source is readily available, or even if so, may not have the appropriate cable or adapter available to use with a particular power source.

With traditional power sources, such as those noted above, it is often difficult to charge multiple devices at the same time, especially where each device requires a separate charging cable. For example, a car charger port may only handle a single cable at a time. Adaptor devices are available on the market for connecting multiple devices to a power source at the same time—for example, a two-to-one or three-to-one car charger splitter. However, such adapters are often only compatible with certain interfaces. Moreover, such adapters are separate from portable power sources and tend to be bulky.

Similarly, connection interface attachments are also available for adapting a charging cable for use with a variety of devices for recharging from a power source, each requiring a different interface connection. However, such attachments are usually separate small pieces, and therefore difficult to keep track of when not in use. Further, use of such attachments does not solve the problem presented by the need to charge multiple devices at the same time, from the same power source, as oftentimes, only one attachment can be used with a charging cable at a time.

Portable power chargers exist that permit recharging of electronic devices when a standard power source is not readily available. For example, portable power chargers are illustrated and described in co-pending U.S. application Ser. Nos. 13/571,992, filed Aug. 10, 2012, and 13/682,985, filed Nov. 21, 2012, which share common inventors with the present application and which are incorporated herein by reference. Some existing power charger devices usually cannot charge multiple devices at the same time, either due to limited capacity or connectivity options. Even if multiple devices may be attached to the power charger at the same time, the charger may prioritize how the devices are recharged—i.e., it will charge one device first and then the second, and so on. However, this approach takes a long time to recharge all devices and risks not having sufficient charge remaining in the charger for fully charging the second device.

Further, some portable charger devices will not permit recharging from the charger when the charger is itself being recharged or connected to an external power source. Such devices require the charger unit to be disconnected from a power source before a charge will be passed on to a device connected to the charger, or require the charger unit to be fully charged first before any device connected to the charger unit can then be recharged.

Wireless power chargers have been introduced to the market, especially for mobile electronic devices, that have provided additional approaches to recharging portable electronic devices. Such wireless power transmission devices have been developed in connection with wireless charging standardization efforts, including by the Wireless Power Consortium (WPC), which have led to the adoption of devices that permit recharging of electronic devices without the use of separate chargers for each device. More particularly, the WPC has introduced the Qi wireless charging standard. Qi, which translates to "vital energy," takes its name from the Chinese concept of intangible flow of power and utilizes magnetic coil induction to transmit a charge from a transmitter to a receiver via a magnetic field.

Commonly, a wireless power transmission device utilizing magnetic coil induction includes a charging mat that must be connected to an external power source, such as a wall socket or a car charger socket, in order to transmit power wirelessly. The charging mat includes a transmitter having a coil. When a current is passed through the transmitter coil, a magnetic field is generated and transmitted to an electronic device placed on the charging mat. Such a device, in order to be wirelessly charged via the charging mat, must include a receiver having a coil, typically connected to the internal battery of the electronic device. When the electronic device is placed on an energized charging mat in a particular location, the receiver receives the wirelessly transmitted power in the form of a magnetic field, which induces a voltage in the receiver coil that can be used to power the electronic device or charge the internal battery of such a device.

Various drawbacks of prior art wireless power chargers have been identified. For example, such wireless chargers are not easily portable and require connection to an external power source for operation. Such external power sources are often not readily available, which makes the charger useless for on-the-go use. Additionally, some charging mat designs are often too small to be able to charge more than one electronic device at the same time. As noted, some wireless charging mats require a device to be placed in a particular spot—e.g., a Qi spot—where the transmitter and receiver coils must be aligned in order for a charge to be transmitted. Increasing the size of the charging mat may be undesirable, as it may take up too much space or be aesthetically unpleasing.

In view of the foregoing, there is a need for a charger that can be used to charge a variety of electronic devices, including but not limited to smart phones, mobile phones, data tablets, music players, cameras, camcorders, gaming units, e-books, Bluetooth® headsets and earpieces, GPS devices, and the like, either individually or simultaneously in various combinations. Additionally, there is a need for such a charger that is portable, has a compact size, and is easy to use in various conditions and locations to charge one or more electronic devices simultaneously, including but not limited to in a house or office, a car or an airplane, as well as on-the-go, without compromising operation and performance. Still further, there is a need for a portable charger that can be recharged from an external power source or from a wireless power transmission device, providing increase flexibility and convenience of use for the portable charger. Still further, there is a need for a portable charger that can recharge its internal battery from an external power source or a wireless charging device at the same time as an electronic device connected to the charger, either directly or wirelessly, is being recharged by or via the charger unit. Still further, there is a need for a portable charger unit in a compact size that has increased functionality for a user requiring a portable source of power. Accordingly, it is a general object of the present invention to provide a portable charger that improves upon conventional power chargers currently on the market and that overcomes the problems and drawbacks associated with such prior art chargers.

SUMMARY OF THE INVENTION

In accordance with the present invention, a portable charger is provided for charging one or more portable electronic devices. In general, a portable charger includes an internal rechargeable battery unit for connecting to and recharging one or more electronic device, as necessary, and wireless power transmission components, such as a receiver and transmitter, for recharging the charger as well as electronic devices via wireless power transmission methods. The portable charger may also include at least one connector cable for connecting the power charger unit with an external power source, or at least one electronic device, or both. Similarly, the portable charger may also include at least one power connection port for connecting the power charger unit with an external power source, or at least one electronic device, or both.

In a first aspect of the present invention, the charger unit comprises a charger housing with at least one power connection port that can function as a power input, a power output, or both. A rechargeable internal battery is disposed within the charger housing and is operatively connected with the power connection port for providing an electrical charge from an external power source for recharging the internal battery when the charger unit is connected to the power source via the power connection port (acting as a power input) and/or for charging other electronic devices from the internal battery via the power connection port (acting as a power output). The charger unit is portable as a result of the small size of the housing. Despite the small size of the unit, the power capacity is very high so that the charger can accommodate multiple electronic devices at the same time.

In another aspect of the present invention, the charger unit includes a wireless transmitter operatively connected to the internal battery for transmitting a power charge to an electronic device having a wireless receiver. The charger unit may further include a wireless receiver operatively connected to the internal battery for receiving a power charge from a power source having a wireless transmitter. In embodiments of the charger unit including both a wireless transmitter and a wireless receiver, the charger unit can both be charged wirelessly, for example, when placed on a wireless power transmission device (e.g., wireless charging mat), and charge other devices wirelessly, for example, when a device is placed on the charger housing.

In embodiments of the present invention, the power connection port can comprise a female port adapted for receiving a complementary male connection interface of a standard charging cable, which connects at an opposite end to a portable electronic device. In other embodiments, the power connection port can be a charging cable attached to the charger housing and preferably stored within the charger housing when not in use. In preferred embodiments of the present invention, the charger unit includes both wireless charging capabilities, and direct charging connectivity.

In additional embodiments of the charger unit of the present invention, one or more connector cables, each having a respective connection interface, is attached to the charger housing and operatively connected to a respective power connection port of the charger unit. Preferably, the charger housing includes one or more cavity in which each connector cable may be stored, when not in use, and from which each connector cable may be removed when needed for recharging an electronic device. In a more preferable embodiment of the charger unit, the unit includes multiple connector cables each with a respective storage cavity formed in the charger housing, thereby permitting multiple electronic devices to be charged by the charger unit simultaneously.

In various embodiments of the present invention, the charger unit may further comprise a controller or processing unit, which can control wireless and direct connectivity with the charger unit, keep track of the capacity level of the battery unit, store data or provide a conduit means by which data can be exchanged between electronic devices, such as between a smart phone and a computer.

These and other objects, features and advantages of the present invention will become apparent in light of the detailed description of embodiments thereof, as illustrated in the accompanying drawings.

BRIEF DESCRIPTION OF THE DRAWINGS

FIG. 4 shows a planar end view of the portable power charger of FIG. 1.

FIG. 5 shows a planar end view of the portable power charger of FIG. 1.

FIG. 6 shows a planar side view of the portable power charger of FIG. 1.

FIG. 7 shows a planar side view of the portable power charger of FIG. 1.

FIG. 15 shows a perspective view of another embodiment of a portable power charger for recharging an electronic device in accordance with the present invention.

FIG. 16 shows a perspective view of another embodiment of a portable power charger for recharging an electronic device in accordance with the present invention.

FIG. 17 shows a perspective view of an embodiment of a portable power charger for recharging the portable power charger and multiple electronic devices in accordance with the present invention.

FIG. 18 shows a perspective view of another embodiment of a portable power charger for recharging the portable power charger and multiple electronic devices in accordance with the present invention.

FIG. 19 shows a perspective view of an embodiment of a portable power charger for recharging multiple electronic devices in accordance with the present invention.

DETAILED DESCRIPTION OF THE DRAWINGS

Figure 1:
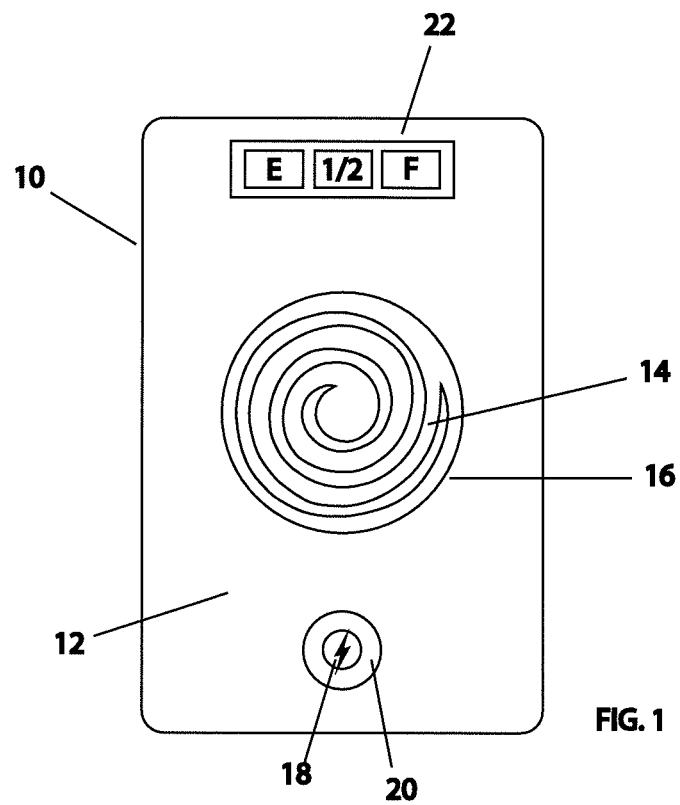
FIG. 1 shows a planar top view of a first embodiment of a portable power charger in accordance with the present invention.

A portable power charger in accordance with an embodiment of the present invention is shown in FIGS. 1-7, and generally designated as reference numeral 10. The power charger unit 10 generally includes a rechargeable internal battery unit 80, illustrated in FIG. 20, disposed within a charger housing 12. The power charger 10 is designed for portability and convenient on-the-go use to recharge one or more portable electronic devices. The power charger 10 is also designed for easy and flexible recharging of the internal battery 80 from a variety of power sources so that it can be easily charged up to have sufficient battery capacity when it is needed to recharge a portable electronic device.

The internal battery unit 80 of the portable power charger 10 is capable of being recharged in a variety of manners, including via direct connection with an external power source via a power input connector cable provided with the charger 10, via direct connection with an external power source via a separate connector cable that engages a power connection port provided on the charger housing 12, or via wireless power transmission means. A portable power charger in accordance with the present invention can include any or all of these recharging features in various combinations without departing from the principles and spirit of the present invention.

Similarly, the power charger 10 can be used to recharge one or more portable electronic device in a variety of manners, including via direct connection with an electronic device via a power output connector cable provided with the charger 10, via direct connection with an electronic device via a separate connector cable that engages a power connection port provided on the charger housing 12, or via wireless power transmission means. A portable power charger in accordance with the present invention can include any or all of these recharging features in various combinations without departing from the principles and spirit of the present invention.

Figure 2:
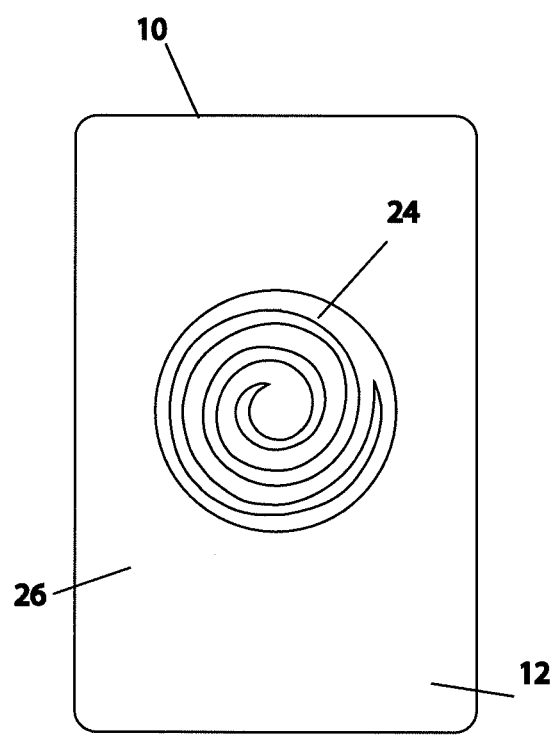
FIG. 2 shows a planar bottom view of the portable power charger of FIG. 1.
Figure 20:
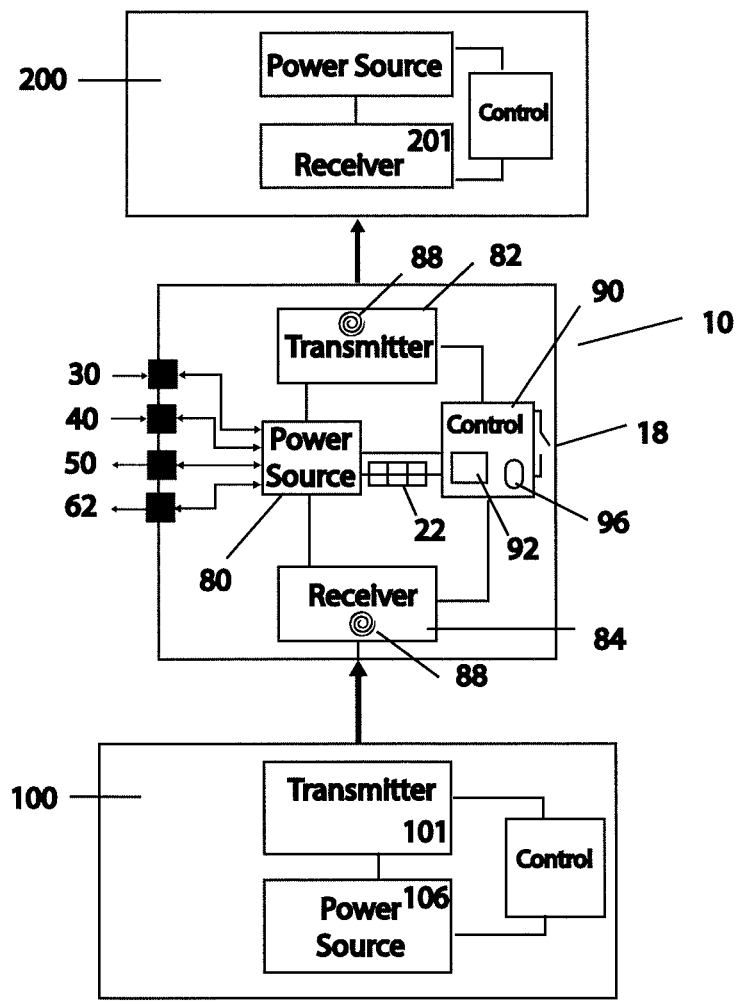
FIG. 20 illustrates a block diagram of a charging system in accordance with embodiments of the present invention including a wireless power transmission device, a portable charger unit in accordance with the present invention, and an electronic device to be charged.

Referring to FIGS. 1 and 2, the portable power charger 10 is equipped with components for wireless power transmission, both from an external power source, such as a wireless charging mat as is known in the art, and to an electronic device. In this regard, the power charger 10 includes a wireless transmitter 82 for transmitting a charge to an electronic device and a wireless receiver 84 for receiving a charge from a wireless charging mat or power transmitting device, as generally illustrated in FIG. 20.

The wireless transmitter 82 of the power charger 10 generally comprises a magnetic induction coil 86 operatively connected to the internal battery unit 80. Referring to FIG. 1, a wireless transmission area 14 generally aligned with the transmitter coil 86 is illustrated. When an electronic device that includes a wireless receiver is aligned with the wireless transmission area 14, a magnetic field generated by the transmitter 82 is transmitted to the electronic device, where a voltage is induced to power the electronic device or recharge its internal battery. In this regard, the designated wireless transmission area 14 is visible to the user so as to facilitate proper alignment and wireless charging. A power indicator 16 may be provided to indicate that an electronic device is being wirelessly charged from the power charger 10. As illustrated, the power indicator 16 is an annular LED light surrounding the wireless transmission area 14.

Operation of the power charger 10 to transmit a wireless charge to an electronic device via the wireless transmitter 82 may be controlled by a power interface 18, such as an on/off button, as shown in FIG. 1. An LED power indicator ring 20 may be provided with the button 18 to indicate whether the power charger 10 is on or off. As further illustrated, a power capacity indicator means 22 is also provided to indicate the capacity of the internal battery unit 80, as will be described in more detail below.

The wireless receiver 84 of the power charger 10 generally comprises a magnetic induction coil 88 operatively connected to the internal battery unit 80. Referring to FIG. 2, a wireless reception area 24 generally aligned with the receiver coil 88 is illustrated. To recharge the internal battery unit 80 of the power charger 10, the charger 10 can be placed on a wireless power transmission device with an appropriate wireless transmitter, such as a wireless charging mat as is generally known in the art. When the power charger 10 is placed on a wireless transmission device with the wireless reception area 24 generally aligned with the transmitter of the transmission device, a magnetic field generated by the transmitter is transmitted to the wireless receiver 84 of the power charger 10. A voltage is induced in the receiver coil 88, which voltage can be used to power the power charger 10 so long as it remains aligned with the transmission device or used to recharge its internal battery 80 for future use away from the wireless transmission device. Though not shown, a separate power indicator may be provided on the charger housing 12 to indicate that the power charger 10 is being wirelessly charged from a wireless transmission device. Alternatively, the power indicator 16, shown in FIG. 1 can be used to indicate both when the power charger 10 is being charged from a wireless transmission device and when the charger 10 is being used to charge other devices.

As with known wireless power transmission devices, such as wireless charging mats ascribing to wireless charging standardization efforts, the wireless transmitter of a charging device and the wireless receiver of a device to be charged typically must be aligned for the charge to be transferred. In this regard, the bottom surface of the power charger 10 may include a rubber tack pad 26 to ensure sufficient friction between the power charger 10 and the wireless transmission device so that there is a reduced risk of the power charger 10 slipping and becoming misaligned while it is recharging. A similar tacky surface or material can be provided on the top surface of the charger housing 12 to ensure sufficient stick between the power charger 10 and an electronic device being recharged from the power charger 10 via wireless transmission means.

The wireless charging capabilities of the power charger 10 in accordance with the present invention are beneficial in that they improve upon the convenience provided by wireless charging technology. For example, a portable electronic device can be recharged on-the-go even when the proper charging connector or cable is not available. Indeed, the compact and portable design of the power charger 10 can permit charging of an electronic device in the user's pocket or purse simply be ensuring the electronic device is properly aligned with and proximate to the power charger. Additionally, once the power charger 10 is charged, a portable electronic device can be recharged without needing to be near an external power source, such as a wall socket, a car charger socket, an airplane charger socket, or a computer, which may not be readily available.

The power charger 10 of the present invention also permits wireless power transmission technology to be used to recharge multiple devices at the same time regardless of the available space on a wireless transmission device or the preoccupation of the wireless transmitter space(s) on the transmitting device. For example, a conventional wireless charging mat or pad includes one or more transmission spots with which a device requiring recharging must be aligned for a sufficient charge to be transmitted. As a result, transmission capabilities of the wireless charging system are often dictated by the size of the charging mat, and if a device is already placed on the mat in the designated transmission spot, then other devices cannot be recharged until the first device is charged or removed. In accordance with the present invention, the power charger 10 can transmit a charge while it is being recharged—because of its inclusion of both a transmitter 82 and a receiver 84, and as a result, the transmission spot of the charging mat is fully not tied up even when the power charger 10 is being recharged on the charging mat.

Figure 10:
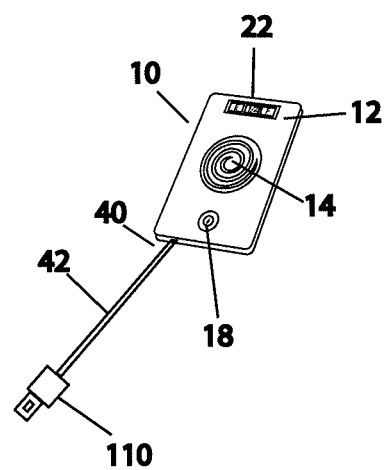
FIG. 10 shows a perspective view of another embodiment of a portable power charger as used with a wireless power transmission system for recharging the portable power charger in accordance with the present invention.
Figure 14:
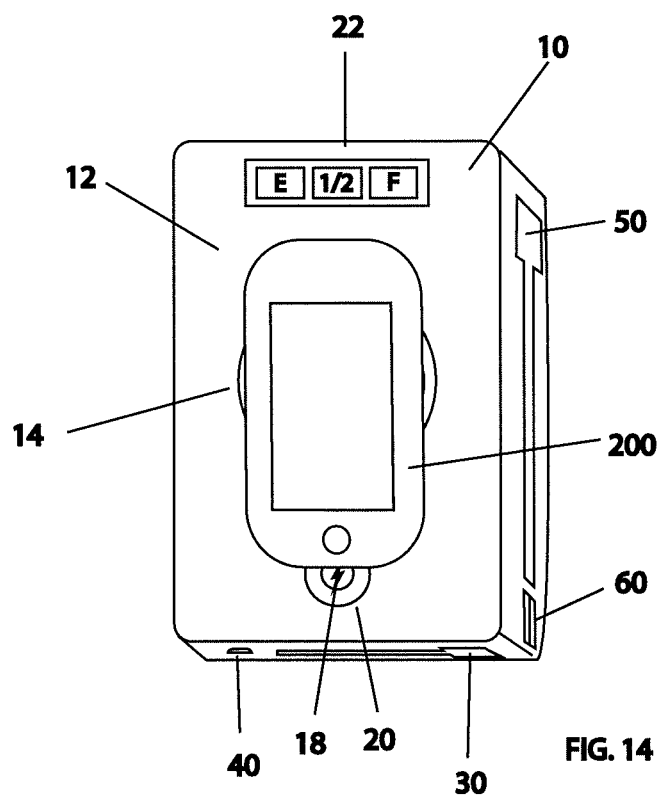
FIG. 14 shows a perspective view of an embodiment of a portable power charger for recharging an electronic device in accordance with the present invention.

Referring to FIG. 10, the present invention can be used to charge both the power charger 10 and an electronic device simultaneously using a single wireless charging mat (with one designated transmission area) via a wireless transmission stack. As illustrated, a wireless charging mat as is generally known in the art is designated as reference numeral 100 and includes a wireless transmission area 102. The wireless charging mat 100 is connected to an external power source—e.g., a wall socket, as illustrated. A power charger 10 in accordance with the present invention is placed on the wireless transmission area 102. A portable electronic device, generally designated as reference numeral 200, is placed on top of the power charger 10. The electronic device 200 includes a wireless receiver, such as a chip or similar component designed to receive power from an electromagnetic field in accordance with wireless charging standardization efforts. Thus, a charge is transmitted from the charging mat 100 to the receiver 84 of the power charger 10, which recharges the internal battery unit 80 of the power charger 10. At the same time, a charge is transmitted from the power charger 10 via its transmitter 82 to an electronic device 200 aligned therewith. As noted above, once the power charger 10 is fully charged, it may also be used separate from the wireless charging pad 100 to wireless recharge an electronic device 200 via the transmitter 82, as shown in FIG. 14.

Referring to FIGS. 3-7, the power charger 10 of the present invention also has the capability of charging other devices or being recharged itself via direct connections, either using connector cables provided with and stored in the charger housing 12, or via separate connector cables attachable to the charger 10 via power connection ports provided on the charger housing 12. In this regard, the power charger 10 can be used on-the-go to charge one or more electronic devices by various means and combination of means. Thus, the charger unit 10 can be recharged either wirelessly or via direct connection to an external power source, and at the same time be connected to multiple electronic devices by both wireless and direct connection means, as illustrated in FIGS. 17 and 18. Similarly, the charger unit can be connected to multiple electronic devices by both wireless and direct connection means, as illustrated in FIG. 19.

Figure 3:
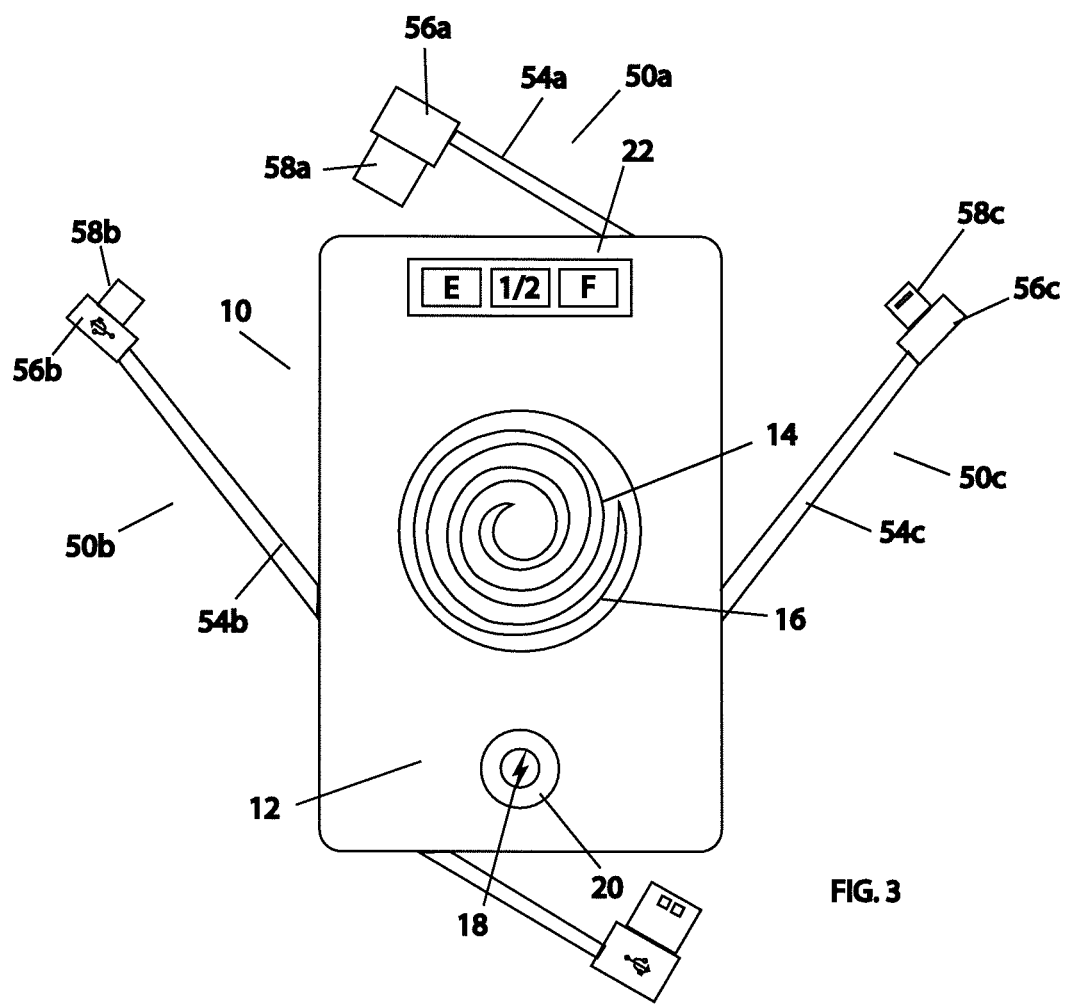
FIG. 3 shows a planar top view of the portable power charger of FIG. 1 with a power input connector cable and multiple power output connector cables extending from the charger housing ready for use.
Figure 9:
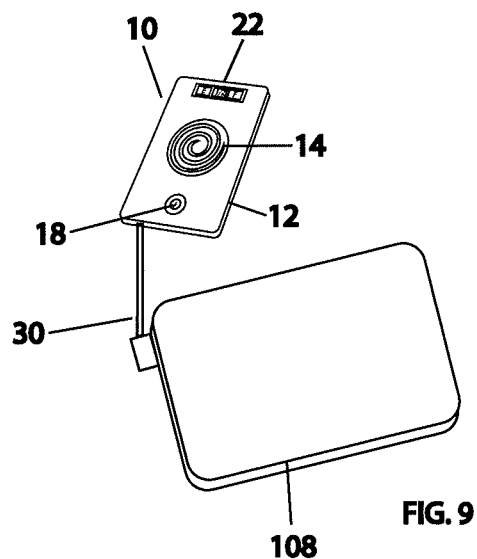
FIG. 9 shows a perspective view of another embodiment of a portable power charger as used with a wireless power transmission system for recharging the portable power charger in accordance with the present invention.

Referring to FIGS. 3-4, the power charger 10 may include a built-in power input connector cable 30 that is preferably stored within a cavity 32 formed in the charger housing 12 when not is use, and removed from the cavity 34 for use. FIG. 3 shows the connector cable 30 flexed out of its cavity 32 for connection to an external power source. FIG. 4 shows the connector cable 30 stored within the cavity 32. The power input connector cable 30 is operatively connected with the internal battery 80 for providing a charge to the battery unit 80 when the power charger 10 is connected to an external power source via the connector cable 30. The connector cable 30 comprises a cord portion 34 and a head portion 36 having a connection interface 38 designed for engagement with an external power source or an adapter unit. As illustrated, the connection interface 38 for the power input connector cable 30 is a standard USB male interface adapted for engagement with a USB female port, such as a port provided on a computer (FIG. 9). Though illustrated as a USB interface, the power connection cable interface 38 can utilize any known connection interface without departing from the principles and spirit of the present invention, including but not limited to a micro-USB interface, a mini-USB interface, an AC-DC interface, or the like.

The cavity 32 for the power input connector cable 30 is preferably designed to have a complementary shape to the connector cable 30 so that the cable 30 can be stored within the general volume and footprint of the charger housing 12 when not in use. In this regard, the existence of the connector cable 30 does not interfere with use of the power charger 10, and further does not detract from the size and appearance of the charger 10. When the power input connector cable 30 is needed for use, it can be disengaged from its cavity 32 and extended away from the charger housing 12 as shown in FIG. 3 so that the head portion 36 and interface 38 can engage an appropriate external power source or adapter unit. As illustrated, the cord portion 34 can be disengaged from the cavity 32 to flex the connector cable 30 outwardly from the charger housing 12. A finger space (not shown) can be provided to assist the user to get a grip on the connector cable 30. Alternatively, the power input connector cable 30 can be retracted within the charger housing 12 to a non-use position, for example, using a spring-biased retraction mechanism as is generally known in the art.

Referring again to FIG. 4, a power input connection port 40 may also be provided on the charger housing 12. The power input connection port 40 is operatively connected with the internal battery 80 to provided a charge to the internal battery 80 when the power charger 10 is connected to an external power source via the power input connection port 40. As shown, the power input connection port 40 comprises a micro-USB female interface, though the power input connection port 40 can utilize any known connection interface without departing from the principles and spirit of the present invention, including but not limited to a USB interface, a mini-USB interface, an AC-DC interface, or the like. In operation, a separate connector cable—such as cable 42 illustrated in FIG. 10—can be used to connect the power charger 10 with an external power source via the power input connection port 40.

Though the illustrated embodiment shows both a power input connector cable 30 and a power input connection port 40, the present invention can use either means for power input. Further, the power charger 10 can use connection means, either in the form of a connector cable or a power connection port, that utilize a two-way charging interface, such as described in co-pending U.S. application Ser. No. 13/682,985, incorporated herein by reference.

Referring to FIGS. 3 and 5-7, multiple built-in power output connector cables 50 are provided with the charger housing 12 for connecting the power charger 10 with electronic devices. Each connector cable 50 is preferably stored within a respective cavity 52 formed in the charger housing 12 when not in use, and removed from the cavity 52 for use. FIG. 3 shows the connector cables 50 flexed out of their cavities 52 for connection to electronic devices. FIGS. 5-7 show connector cables 50 stored within their respective cavities 52. The power output connector cables 50 are operatively connected with the internal battery 80 for providing a charge to a respective electronic device connected to the power charger 10 via the connector cables 50. Each connector cable 50 comprises a cord portion 54 and a head portion 56 having a connection interface 58 designed for engagement with an electronic device or an adapter unit.

The cavity 52 for each power output connector cable 50 is preferably designed to have a complementary shape to the connector cable 50 so that the cable 50 can be stored within the general volume and footprint of the charger housing 12 when not in use. In this regard, the existence of the connector cable 50 does not interfere with use of the power charger 10, and further does not detract from the size and appearance of the charger 10. When a power output connector cable 50 is needed for use, it can be disengaged from its cavity 52 and extended away from the charger housing 12, as shown in FIG. 3, so that the head portion 56 and interface 58 can engage an appropriate electronic device or adapter unit. As illustrated, the cord portion 54 can be disengaged from the cavity to flex the connector cable 50 outwardly from the charger housing 12. Finger spaces (not shown) can be provided to assist the user to get a grip on the connector cables 50. Alternatively, the power output connector cables 50 can be retracted within the charger housing 12 to respective non-use positions, for example, using a spring-biased retraction mechanism as is generally known in the art.

Preferably, each of the output connector cables 50 utilizes a different connection interface 58 to increase the versatility of the power charger 10 so that it can be connected with devices having different connection interfaces without requiring the use of separate adapter devices. As shown in FIGS. 3 and 5, a first power output connector cable 50a can include a 30-pin connection interface 58a. As shown in FIGS. 3 and 6, a second power output connector cable 50b can include a micro-USB connection interface 58b. As shown in FIGS. 3 and 7, a third power output connector cable 50c can include an Apple Lightning™ connection interface 58c. These interfaces 58 can utilize any known connection interface without departing from the principles and spirit of the present invention.

In accordance with the present invention, multiple electronic devices can be connected to the power charger 10 at the same time for recharging, such as shown in FIG. 19. Additionally, the power charger 10 can itself be connected with an external power source, such as a wireless charging mat 100 or a wall socket, and still be capable of recharging multiple electronic devices simultaneously, as shown in FIGS. 17 and 18.

Referring to FIGS. 6 and 7, power output connection ports 60 may also be provided on the charger housing 12. The power output connection ports 60 are operatively connected with the internal battery 80 to provide a charge from the internal battery 80 to an electronic device when the power charger 10 is connected to an electronic device via a power output connection port 60. As shown, the power output connection ports 60 comprise USB female interfaces, though each power output connection port 60 can utilize any known connection interface without departing from the principles and spirit of the present invention, including but not limited to a micro-USB interface, a mini-USB interface, an AC-DC interface, or the like. In operation, a separate connector cable—such as cable 62 illustrated in FIGS. 13 and 16-19—can be used to connect the power charger 10 with an electronic device via a power output connection port 60.

Though the illustrated embodiment shows both power output connector cables 50 and power output connection ports 60, the present invention can use either means for power output. Further, the power charger 10 can use connection means, either in the form of a connector cable or a power connection port, that utilize a two-way charging interface, such as described in co-pending U.S. application Ser. No. 13/682,985, incorporated herein by reference.

In preferred embodiments of the present invention, the power charger 10 can be automatically turned on when an electronic device is connected to the power charger 10 via a power output connector cable 50 or a power output connection port 60. Further, the power charger 10 can use a power-off logic that automatically turns the charger 10 off after a pre-designated time period, provided certain criteria have been met. Such a protocol is described in co-pending U.S. application Ser. No. 13/682,985, with is incorporated herein by reference, whereby the power charger 10 will automatically turn off after a predefined time delay after it is determined that the internal battery of all electronic devices connected to the power charger 10 are fully charged. Additionally, a manual power interface 18, such as the on/off button shown in FIG. 1, can be provided to turn the power charger 10 on and off as desired.

Referring to FIG. 1, the charger housing 12 includes a power capacity indicator means 22 that indicates the remaining capacity of the internal battery 80 in the charger unit 10. For example, in an embodiment of the present invention illustrated in FIG. 1, the power indicator means 22 comprises a series of lights, which can include more or fewer lights without departing from the principles and spirit of the present invention, that light up to indicate the power level of the internal battery 80. In operation, a processing unit 92 disposed within the charger 10 communicates with the battery unit 80 to determine how much capacity is remaining in the battery 80. Upon determining the capacity level, the processing unit 92 communicates with the power capacity indicator means 22 to provide the user with the appropriate signal for showing how much capacity is remaining in the internal rechargeable battery unit 80. For example, when the battery is at full capacity, a specific light associated with the "full" designation (F) will be lit up or alternatively, all the lights in a series of lights will be lit up. As the battery power decreases, the lights will switch as appropriate as the power is used or alternatively, correspondingly decrease by one. If there is no capacity left in the internal battery unit, an "empty" indicator (E) may be lit up, or alternatively, none of the lights will be lit up. The indicators may further be colored coordinated so that, for example, a green light corresponds to full battery capacity, a yellow light corresponds to half battery capacity, and a red light corresponds to an empty battery. Alternatively, a single light, can change color to indicate the power level. For example, when the charge is high, the light can be green; when the charge is medium, the light can be yellow, and when the charge is low or exhausted, the light can be red. Still further, the power capacity indicator means 22 can comprise a digital interface that provides a battery capacity level for the internal rechargeable battery unit 80, or another known means of providing battery level information.

In operation, a portable power charger 10 in accordance with the present invention can be used in a variety of manners for recharging the power charger itself, as well as for recharging portable electronic devices. As a result of the compact size of the power charger 10 and the capacity of the built-in power bank, the power charger 10 can be used on-the-go to recharge a variety of electronic devices, including but not limited to smart phones, mobile phones, data tablets, music players, cameras, camcorders, gaming units, e-books, Bluetooth® headsets and earpieces, GPS devices, and the like, either individually or simultaneously in various combinations.

In preferred embodiments, the rechargeable battery unit 80 is preferably a Lithium-Ion battery that can be recharged by connecting the power charger 10 to an external power source, such as a computer, a wall socket, a car or an airplane power supply, or to a wireless power transmission device, such as a wireless charging mat 100. The rechargeable battery unit 80 is disposed within the charger housing 12 and is operatively connected with the power receiver 84, the power input connector cable 30, and the power input connection port 40 for recharging the battery 80 when the charger unit 10 is wirelessly connected to a wireless charging mat 100 or directly connected to an external power source via a power input means. The rechargeable battery unit 80 is also operatively connected with the power transmitter 82, the power output connector cables 50, and the power output connection ports 60 for transmitting a charge to one or more electronic devices connected to the power charger 10, either wirelessly or through power output means.

Figure 8:
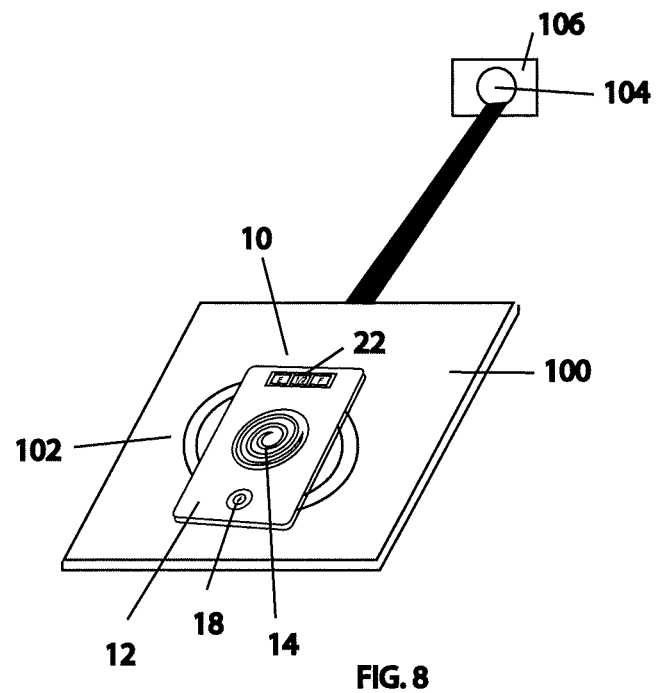
FIG. 8 shows a perspective view of an embodiment of a portable power charger as used with a wireless power transmission system for recharging the portable power charger in accordance with the present invention.

As shown in FIG. 8, a portable power charger 10 can be recharged by placing it on a wireless power transmission device, such as a wireless charging mat 100. In this set-up, the internal battery 80 of the power charger 10 is recharged wirelessly from the wireless charging mat 100 via a charge transmitted from a transmitter 101 in the wireless charging mat 100 to the receiver 84 in the power charger 10. As shown, the wireless charging mat 100 is connected to an external power source, such as via a wall plug interface 104 plugged into a wall socket 106.

Referring to FIGS. 9 and 10, the portable power charger 10 can also be charged by direct connection with an external power source. As shown in FIG. 9, the power charger 10 can be connected via a power input connector cable 30 to a power source, such as a computer 108. As shown in FIG. 10, a separate connector cable 42 can be used to connect the power charger 10 with an external power source via a power input connection port 40. In FIG. 10, for example, the separate cable 42 includes a car charger interface 110 so that the power charger 10 can be recharged in a car charger socket (not shown).

Figure 11:
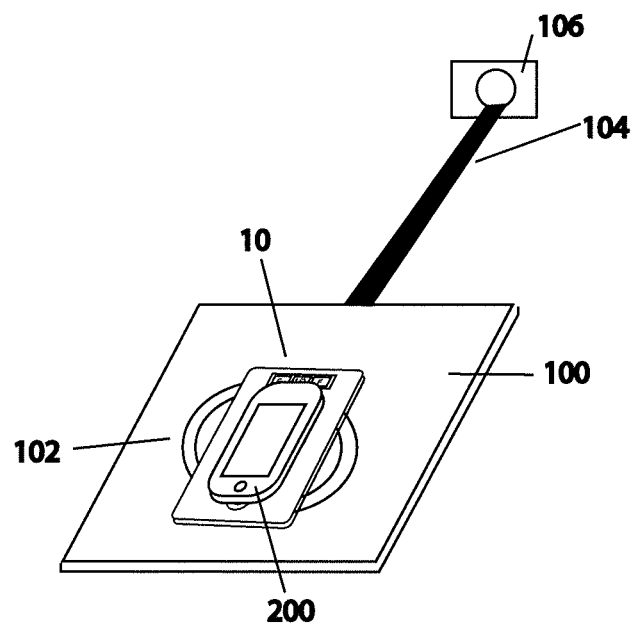
FIG. 11 shows a perspective view of an embodiment of a portable power charger as used with a wireless power transmission system for recharging the portable power charger and an electronic device in accordance with the present invention.

Referring to FIG. 11, the power charger 10 can be used to wirelessly recharge an electronic device 200, even while it is itself being recharged. As shown, the power charger 10 is placed on the wireless transmission area 102 of a wireless charging mat 100 so that the internal battery 80 of the power charger 10 can be recharged. An electronic device 200, such as a smart phone, can be stacked on top of the power charger 10 to be recharged at the same time. Once the internal battery 80 of the power charger 10 is fully charged, or even whenever desirable, the user can pick-up the power charger 10 and smart phone 200 and continue to recharge the smart phone 200 from the power charger 10 separately from the wireless charging mat 100. For example, the two items can be placed together in the user's pocket or purse, and the smart phone 200 can continue to be wirelessly charged from the power charger 10 so long as they remain properly aligned.

Figure 12:
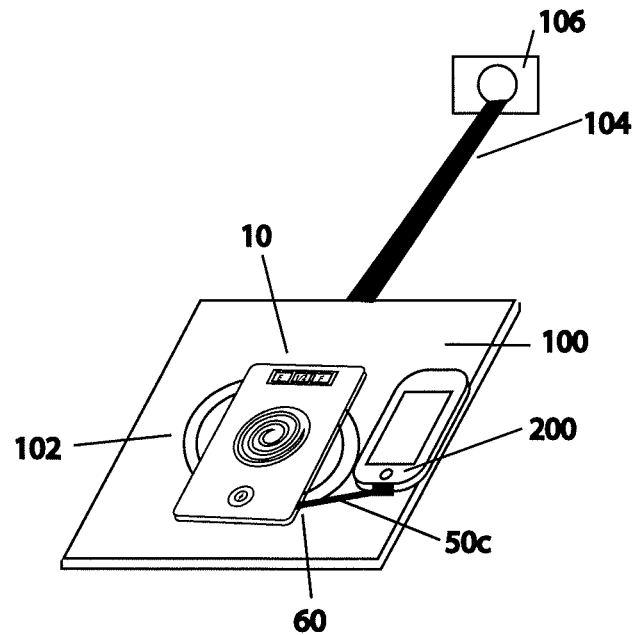
FIG. 12 shows a perspective view of another embodiment of a portable power charger as used with a wireless power transmission system for recharging the portable power charger and an electronic device in accordance with the present invention.
Figure 13:
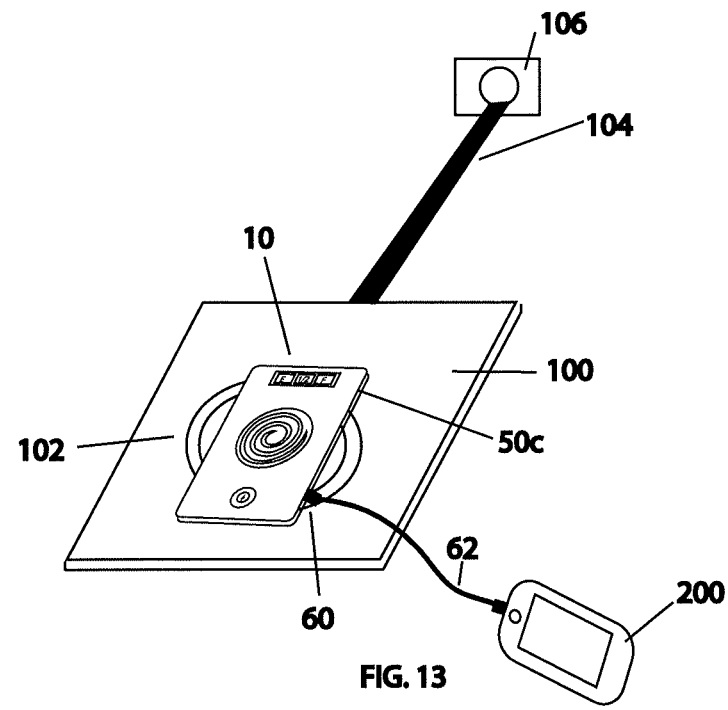
FIG. 13 shows a perspective view of another embodiment of a portable power charger as used with a wireless power transmission system for recharging the portable power charger and an electronic device in accordance with the present invention.

As shown in FIGS. 12-13, an electronic device 200 can be charged from the power charger 10 via a power output connector cable 50 (as shown in FIG. 12) or a power output connection port 60 (as shown in FIG. 13). As shown, the electronic device 200 can be recharged even while the power charger 10 is itself being recharged via wireless connection with the wireless charging mat 100. Similarly, an electronic device 200 can be connected to the power charger 10 in such manner while the power charger 10 is being recharged from direct connection with an external power source via either the built-in power input connector cable 50 or the power input connection port 60, such as illustrated in FIG. 18.

Referring to FIGS. 14-16, an electronic device 200 can be recharged using the power charger 10 where there is no readily accessible external power source, such as a wall socket, a car charger socket, an airplane charger socket, a computer, or a wireless power transmission device. As shown in FIG. 14, an electronic device 200, such as a smart phone, is wirelessly charged from the power charger 10 by stacking the phone 200 on the power charger 10 so that a charge is transmitted from the transmitter 82 of the power charger 10 to a wireless receiver 201 of the phone 200. As shown in FIG. 15, the electronic device 200 is directly connected to the power charger 10 via a power output connector cable 50—e.g., having a micro-USB connector interface 58. As shown in FIG. 16, a separate connector cable 62 is used to interconnect an electronic device 200 with the power charger 10 via a power output connection port 60.

Referring to FIGS. 17-19, the power charger 10 in accordance with the present invention can be used to recharge multiple electronic devices simultaneously, even while it is itself being recharged. For example, an electronic device 200a can be recharged via wireless connection with the power charger 10, while another electronic device 200b is recharged via direct connection with the power charger 10 through a built-in power output connector cable 50, and yet another electronic device 200c is recharged via direct connection with the power charger 10 using a separate cable 62 inserted into a power output connection port 60. As shown in FIG. 17, the electronic devices 200 can be recharged even while the power charger 10 is itself being recharged via wireless connection with a wireless charging mat 100. As shown in FIG. 18, the electronic devices 200 can be recharged even while the power charger 10 is itself being recharged via a direct connection with an external power source (e.g., computer 108) using a built-in power input connector cable 30.

The charger housing 12 encloses various electrical components (such as integrated circuit chips and other circuitry) to provide computing operations for the device. The integrated circuitry and other components may comprise a power supply (e.g., the internal rechargeable battery), a microprocessor and controller (e.g., a CPU), memory (e.g., ROM, RAM, flash), a circuit board, a hard drive, and/or various input/output (I/O) support circuitry. The electrical components may also include components for sending and receiving data and media (e.g., antenna, receiver, transmitter, transceiver, etc.), in addition to wireless transmission of power, as discussed above.

Referring to FIG. 20, the charger unit 10 comprises a controller 90, including a processing unit 92, configured to execute instructions and to carry out operations associated with the charger unit 10. For example, the processing unit 92 can control wireless operation of the charger 10 when the transmitter 82 and/or receiver 84 are aligned with respective receivers and transmitters, keep track of the capacity level of the internal battery unit 80, store data or provide a conduit means by which data can be exchanged between electronic devices, such as between a smart phone and a computer. For example, the processing unit 92 communicates with the battery unit 80 to determine how much capacity is remaining in the battery 80. Upon determining the capacity level, the processing unit 92 communicates with the power indicator means 22 to provide the user with the appropriate signal for showing how much capacity is remaining in the internal rechargeable battery unit 80.

For wireless charging, the controller 90 utilizes control circuitry 94 operatively connected with the induction coils 86 and 88 of the wireless transmitter 82 and wireless receiver 84, respectively. In accordance with known designs for the Qi wireless charging standard, devices capable of being charged wirelessly often include a chip or other suitable component for directing power to a battery. Control circuitry in such devices detect when such chips or components are aligned so that power can be transmitted and received. In the charger unit 10 of the present invention, the transmitter induction coil 86 generates an electromagnetic field when power is applied thereto—for example, from the internal battery 80 or directly from an external power source. The control circuitry 94 senses when current is being drawn by a receiver (for example, in a portable electronic device 200 aligned with the transmitter 82 of the charger unit 10). When a current is being drawn, the processing unit 92 can control the voltage and/or current supplied from the battery unit 80 to the transmitter 82 so that the electromagnetic filed generated by the transmitter magnetic induction coil 86 will efficiently induce appropriate voltage and current in the receiver of the device being charged. Similarly, the control circuitry 94 senses when a current is available to be drawn by the wireless receiver 84 (for example, when the charger unit 10 is properly positioned on a wireless charging mat 100). When an electromagnetic field is detected, the processing unit 92 can control the power received by the receiver magnetic induction coil 88 and regulate/convert the power into an appropriate voltage and current for recharging the battery unit 80.

The processing unit 92 also preferably includes a timer for automatically turning the charger unit 10 off if there is no device attached to the unit 10 for a predetermined period of time. In this regard, the capacity of the battery 80 can be preserved. Upon shut down of the charger unit 10, the power indicator means 20 will indicate that the charger 10 is being turned off—for example, the lights will provide a sequential blinking signal.

The processing unit 92 further includes a storage unit 96 that provides a place to hold data or instructions for operation of the charger unit 10 and rechargeable battery unit 80, or data exchanged between the charger unit 10, a computer, and electronic devices connected to the charger unit 10, or memory needed for further operations of the charger unit 10.

The foregoing description of embodiments of the present invention has been presented for the purpose of illustration and description. It is not intended to be exhaustive or to limit the invention to the form disclosed. Obvious modifications and variations are possible in light of the above disclosure. The embodiments described were chosen to best illustrate the principles of the invention and practical applications thereof to enable one of ordinary skill in the art to utilize the invention in various embodiments and with various modifications as suited to the particular use contemplated.

What is claimed is:

1. A portable charger unit for recharging at least one electronic device having a rechargeable internal battery, said portable charger unit comprising:
   a charger housing internally storing a rechargeable battery;
   at least one power connection operatively connected to the rechargeable battery capable of operating as at least one of a power input and a power output, wherein when said at least one power connection acts as a power input, an electrical charge current is provided from an external power source to the portable charger unit for recharging the rechargeable battery when the portable charger unit is connected to said external power source via said at least one power connection, and wherein when said at least one power connection acts as a power output, a charge is provided from the rechargeable battery of the portable charger unit to an electronic device to recharge the rechargeable internal battery of said electronic device when said electronic device is connected to the portable charger unit via said at least one power connection; and
   a wireless transmitter operatively connected to the rechargeable battery capable of wireless transmitting a power to an electronic device.

2. The portable charger unit according to claim 1, wherein said wireless transmitter includes a magnetic induction coil operatively connected to the rechargeable battery.

3. The portable charger unit according to claim 2, further comprising a processing unit operatively connected to the rechargeable battery and the wireless transmitter, wherein the processing unit is configured to direct power from the rechargeable battery to the wireless transmitter to wirelessly recharge an electronic device in wireless communication with the portable charger unit.

4. The portable charger unit according to claim 1, further comprising a wireless receiver operatively connected to the rechargeable battery for receiving power transmitted from the wireless transmitting device and directing said power to the rechargeable battery for recharging.

5. The portable charger unit according to claim 4, wherein said wireless transmitter comprises a first magnetic induction coil and said wireless receiver comprises a second magnetic induction coil.

6. The portable charger unit according to claim 5, further comprising a processing unit operatively connected to the rechargeable battery, the wireless transmitter and the wireless receiver, wherein the processing unit is configured to direct power from the rechargeable battery to the wireless transmitter to wirelessly recharge an electronic device in wireless communication with the portable charger unit, and wherein further the processing unit is configured to direct power from the wireless receiver to the rechargeable battery when the portable charger unit is in wireless communication with a wireless power transmission device.

7. The portable charger unit according to claim 1 wherein the at least one power connection comprises at least one of a power connection port and a connector cable operatively connected to the rechargeable battery.

8. The portable charger unit according to claim 7, wherein the at least one power connection comprises:
   a power connection input comprising at least one of a power input connection port and a power input connector cable, said power connection input providing a charge to the rechargeable battery when the portable charger unit is connected to an external power source via the power connection input; and
   a power connection output comprising at least one of a power output connection port and a power output connector cable, said power connection output providing a charge from the rechargeable battery to an electronic device when the electronic device is connected to the portable charger unit via the power connection output.

9. The portable charger unit according to claim 1, further comprising a power indicator means provided on the charger housing for indicating a power capacity in the rechargeable battery of the portable charger unit.

10. A portable charger unit for recharging at least one electronic device having a rechargeable internal battery, said portable charger unit comprising:
   a charger housing internally storing a rechargeable battery;
   at least one power connection operatively connected to the rechargeable battery capable of operating as at least one of a power input and a power output, wherein when said at least one power connection acts as a power input, an electrical charge current is provided from an external power source to the portable charger unit for recharging the rechargeable battery when the portable charger unit is connected to said external power source via said at least one power connection, and wherein when said at least one power connection acts as a power output, a charge is provided from the rechargeable battery of the portable charger unit to an electronic device to recharge the rechargeable internal battery of said electronic device when said electronic device is connected to the portable charger unit via said at least one power connection;
   a wireless transmitter operatively connected to the rechargeable battery capable of wirelessly transmitting a power to an electronic device;
   a wireless receiver operatively connected to the rechargeable battery for receiving a power transmitted from an external wireless transmitting device and directing said power to the rechargeable battery for recharging; and
   a processing unit operatively connected to the rechargeable battery, the wireless transmitter, the wireless receiver and the at least one power connection,
   wherein the processing unit is configured to direct power from the rechargeable battery to the wireless transmitter to wirelessly recharge an electronic device in wireless communication with the portable charger unit,
   wherein the processing unit is configured to direct power from the wireless receiver to the rechargeable battery when the portable charger unit is in wireless communication with the external wireless transmitting device,
   wherein the processing unit is configured to direct power from said at least one power connection to the rechargeable battery when said at least one power connection acts as a power input, and
   wherein the processing unit is configured to direct power from the rechargeable battery to said at least one power connection when said at least one power connection acts as a power output.

11. The portable charger unit according to claim 10, wherein said wireless transmitter comprises a first magnetic induction coil and said wireless receiver comprises a second magnetic induction coil.

12. The portable charger unit according to claim 11, wherein the at least one power connection comprises at least one of a power connection port and a connector cable operatively connected to the rechargeable battery.

13. The portable charger unit according to claim 12, wherein the at least one power connection comprises:
   a power connection input comprising at least one of a power input connection port and a power input connector cable, said power connection input providing a charge to the rechargeable battery when the portable charger unit is connected to an external power source via the power connection input; and
   a power connection output comprising at least one of a power output connection port and a power output connector cable, said power connection output providing a charge from the rechargeable battery to an electronic device when the electronic device is connected to the portable charger unit via the power connection output.

14. The portable charger unit according to claim 10, further comprising a power indicator means provided on the charger housing for indicating a power capacity in the rechargeable battery of the portable charger unit.

15. A portable charger unit for recharging at least one electronic device having a rechargeable internal battery, said portable charger unit comprising:
   a charger housing internally storing a rechargeable battery;
   a wireless transmitter operatively connected to the rechargeable battery capable of wirelessly transmitting a power to an electronic device; and
   a wireless receiver operatively connected to the rechargeable battery for receiving power transmitted from an external wireless transmitting device and directing said power to the rechargeable battery for recharging.

16. The portable charger unit according to claim 15, further comprising a processing unit operatively connected to the rechargeable battery, the wireless transmitter, and the wireless receiver,
   wherein the processing unit is configured to direct power from the rechargeable battery to the wireless transmitter to wirelessly recharge an electronic device in wireless communication with the portable charger unit, and
   wherein the processing unit is configured to direct power from the wireless receiver to the rechargeable battery when the portable charger unit is in wireless communication with a wireless power transmission device.

17. The portable charger unit according to claim 16, further comprising at least one power connection operatively connected to the rechargeable battery capable of operating as at least one of a power input and a power output, wherein when said at least one power connection acts as a power input, an electrical charge current is provided from an external power source to the portable charger unit for recharging the rechargeable battery when the portable charger unit is connected to said external power source via said at least one power connection, and wherein when said at least one power connection acts as a power output, a charge is provided from the rechargeable battery of the portable charger unit to an electronic device to recharge the rechargeable battery of said electronic device when said electronic device is connected to the portable charger unit via said at least one power connection.

18. The portable charger unit according to claim 17, wherein the at least one power connection comprises at least one of a power connection port and a connector cable operatively connected to the rechargeable battery.

19. The portable charger unit according to claim 18, wherein the at least one power connection comprises:
- a power connection input comprising at least one of a power input connection port and a power input connector cable, said power connection input providing a charge to the rechargeable battery when the portable charger unit is connected to an external power source via the power connection input; and
- a power connection output comprising at least one of a power output connection port and a power output connector cable, said power connection output providing a charge from the rechargeable battery to an electronic device when the electronic device is connected to the portable charger unit via the power connection output.

20. The portable charger unit according to claim 15, further comprising a power indicator means provided on the charger housing for indicating a power capacity in the rechargeable battery of the portable charger unit.

\* \* \* \* \*